US009159003B2

(12) United States Patent
Gurcan et al.

(10) Patent No.: US 9,159,003 B2
(45) Date of Patent: *Oct. 13, 2015

(54) OPTIMIZED FONT SUBSETTING FOR A PRINT PATH

(71) Applicant: MICROSOFT CORPORATION, Redmond, WA (US)

(72) Inventors: Ahmet Gurcan, Mercer Island, WA (US); Herman Widjaja, Issaquah, WA (US); Hristo Ivanov, Bellvue, WA (US); Harvinder Singh, Redmond, WA (US); Kanwal Vedbrat, Bellevue, WA (US); Adam Knauff, Port Orchard, WA (US); Jianye Lu, Redmond, WA (US)

(73) Assignee: Microsoft Technology, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,246

(22) Filed: Jan. 7, 2014

(65) Prior Publication Data

US 2014/0118761 A1 May 1, 2014

Related U.S. Application Data

(63) Continuation of application No. 12/820,454, filed on Jun. 22, 2010, now Pat. No. 8,625,165.

(51) Int. Cl.
*G06K 15/02* (2006.01)
*G06F 3/12* (2006.01)

(52) U.S. Cl.
CPC .......... *G06K 15/1802* (2013.01); *G06F 3/1211* (2013.01); *G06F 3/1244* (2013.01)

(58) Field of Classification Search
None
See application file for complete search history.

(56) References Cited

U.S. PATENT DOCUMENTS

| 2007/0159646 | A1* | 7/2007 | Adelberg et al. | 358/1.11 |
| 2008/0028304 | A1* | 1/2008 | Levantovsky et al. | 715/269 |
| 2008/0049242 | A1* | 2/2008 | Kimura | 358/1.12 |
| 2011/0043831 | A1* | 2/2011 | Sprague et al. | 358/1.2 |

FOREIGN PATENT DOCUMENTS

| JP | 2005063052 A | 3/2005 |
| JP | 2007328741 A | 12/2007 |
| JP | 2008305265 A | 12/2008 |
| JP | 2009545064 A | 12/2009 |

OTHER PUBLICATIONS

"Office Action Issued in Chinese Patent Application No. 201180030917.0", Mailed Date: May 28, 2015, 3 pages.
"Office Action Issued in Russian Patent Application No. 2012155867", Mailed Date: Jul. 21, 2015, 5 pages.
"Office Action Issued in Japanese Patent Application No. 2013-516644", Mailed Date: Jun. 22, 2015, 2 pages.

* cited by examiner

*Primary Examiner* — Benny Q Tieu
*Assistant Examiner* — Haris Sabah
(74) *Attorney, Agent, or Firm* — John Jardine; Kate Drakos; Micky Minhas

(57) ABSTRACT

Subject matter described herein is directed to providing font-rendering information (e.g., XPS file) that is usable to print a document. For example, a font file is received that defines a font type included in the document. A determination is made that a quantity of pages of the document does not exceed a subsetting-optimization threshold. When the quantity of pages does not exceed the threshold, a subsetted font file of the font type is generated. The subsetted file is provided, such as via the spool file, to a print subsystem.

20 Claims, 4 Drawing Sheets

OPTIMIZED FONT SUBSETTING FOR A PRINT PATH

CROSS-REFERENCE TO RELATED APPLICATIONS

This application is a continuation of U.S. application Ser. No. 12/820,454 (filed Jun. 22, 2010 and issuing as U.S. Pat. No. 8,625,165), which is hereby incorporated by reference in its entirety.

BACKGROUND

Using fixed-layout document format (e.g., XPS) in a printing solution generally involves creation of a fixed-layout document (e.g., XPS document) that is later passed as a spool file to the print sub-system. Often, this fixed-layout document contains font resources used to reproduce the fixed-layout document. Including font resources is helpful when the fixed-layout document is sent from a client to another computing device (e.g., print server), since the other computing device might not have fonts to which the client had access. Embedding all the fonts in the fixed-layout document can generate a large file that is time consuming to create and communicate between components. Subsetting the fonts (i.e., creating a smaller version of the same font that contains only the necessary font elements (e.g., glyphs) used in the file) can reduce the size of the file; however, subsetting the fonts can delay the start of the printing.

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

Subject matter described herein is directed to providing font-rendering information (e.g., XPS file) that is usable to print a document. For example, a font file is received that defines a font type included in the document. A determination is made that a quantity of pages of the document does not exceed a subsetting-optimization threshold. When the quantity of pages does not exceed the threshold, a subsetted font file of the font type is generated. The subsetted file is provided, such as via the spool file, to a print subsystem.

BRIEF DESCRIPTION OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of the claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Figure 2:
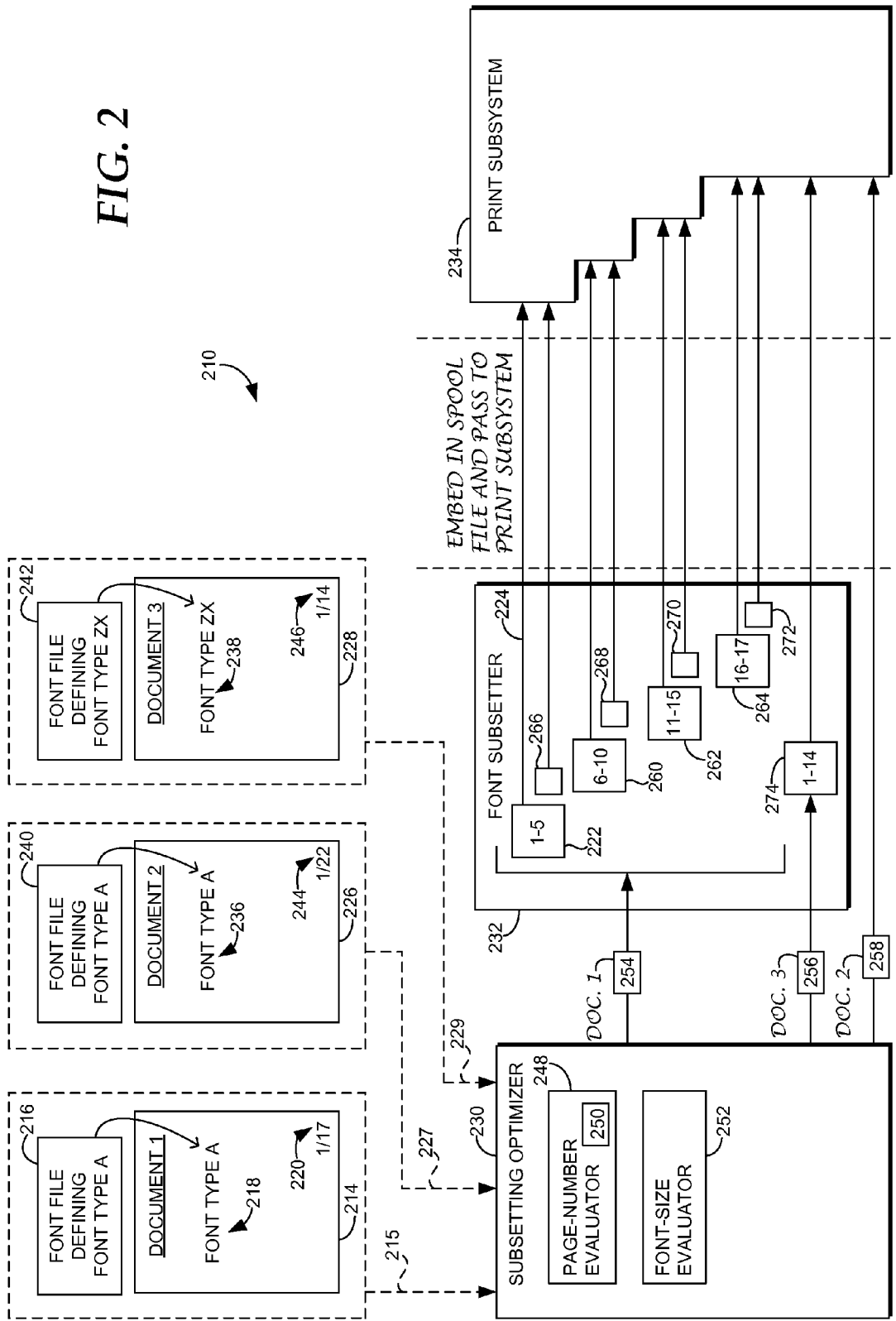
FIG. 2 is a block diagram of an exemplary operating environment in accordance with an embodiment of the present invention.

Generally, an embodiment of the present invention is directed to providing font-rendering information (e.g., XPS file) that is usable to print a document. Referring briefly to FIG. 2, a font file 216 that defines a font type 218 included in document 214 is received. A determination is made that a quantity of pages 220 does not exceed a subsetting-optimization threshold. A subsetted font file 222 of the font type (i.e., font type A) is generated. As depicted by arrow 224, the subsetted font file 222 is provided to be used to print the document 214.

Figure 1:
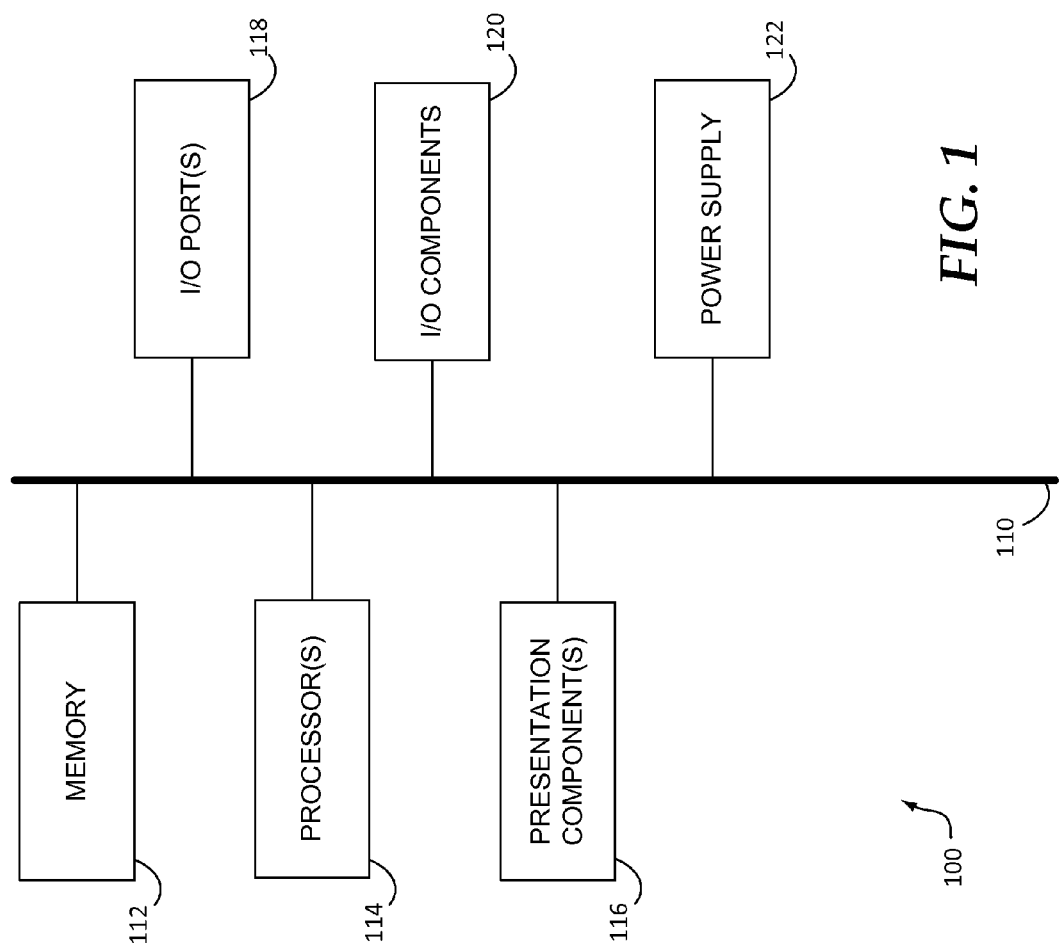
FIG. 1 is a block diagram depicting an exemplary computing device suitable for use in accordance with embodiments of the invention.

Having briefly described an embodiment, FIG. 1 is now described in which an exemplary operating environment for implementing embodiments of the present invention is shown and designated generally as computing device 100. Computing device 100 is but one example of a suitable computing environment and is not intended to suggest any limitation as to the scope of use or functionality of invention embodiments. Neither should the computing device 100 be interpreted as having any dependency or requirement relating to any one or combination of components illustrated.

Embodiments of the invention might be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention might be practiced in a variety of system configurations, including handheld devices, consumer electronics, general-purpose computers, more specialty computing devices, etc. Embodiments of the invention might also be practiced in distributed computing environments where tasks are performed by remote-processing devices that are linked through a communications network.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

With reference to FIG. 1, computing device 100 includes a bus 110 that directly or indirectly couples the following devices: memory 112, one or more processors 114, one or more presentation components 116, input/output ports 118, input/output components 120, and a power supply 122. Bus 110 represents what might be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, computer-readable media might include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Returning now to FIG. 2, an exemplary operating environment suitable for practicing an embodiment of the invention is depicted and identified generally by reference numeral 210. Environment 210 includes documents 214, 226, and 228, a subsetting optimizer 230, a font subsetter 232, and a print subsystem 234. In an embodiment of the present invention, subsetting optimizer 230 and font subsetter 232 process documents 214, 226, and 228 on a per document basis prior to each document 214, 226, and 228 being sent to print subsystem 234. For example, when document 214 is being converted to a printer-friendly format (e.g., XPS or other fixed-layout document format), subsetting optimizer 230 and font subsetter 232 cooperate to subset fonts 218, 236, and 238 in a manner that optimizes spool-file size and an amount of time that passes before printing is initiated (i.e., print start time). Documents 214, 226, 228 might include a variety of formats, such as DIRECT2D, that are convertible to a fixed-layout document format when being printed.

Each of documents 214, 226, and 228 238 are depicted to include a font type 218, 236, and 238. Likewise, each font type 218, 236, and 238 includes a font file 216, 240, and 242. Generally, a font file defines a font type by including a set of elements (e.g., glyphs, characters, symbols, etc) that are usable by a computing device to produce renderings of the font type. For example, font file 216 includes a set of elements that are usable to render font type 218 within document 214. For illustrative purposes, font type 218 is depicted as "font type A," font type 236 is also depicted as "font type A," and font type 238 is depicted as "font type ZX." In an embodiment of the present invention, font file 216, 240, and 242 includes a complete set of elements that are used to render a respective font, regardless of whether a glyph of the font type is included in a respective document. For example, font file 216 includes a complete set of elements that are used to render font type 218, regardless of whether a glyph of font type 218 is included in document 214. Only one font type of each document is depicted in FIG. 2; however, each of documents 214, 226, and 228 might also include additional font types. That is, although for illustrative purposes each document 214, 226, and 228 is depicted with one font type, a document often includes multiple different font types on each page and throughout the document. In addition, each of documents 214, 226, and 228 include a quantity of pages 220, 244, and 246. That is, FIG. 2 illustrates that document 214 includes 17 pages and that page 1 of 17 is being depicted. Likewise, document 226 includes 22 pages, and page 1 of 22 is being depicted. Document 228 includes 14 pages, and page 1 of 14 is being depicted.

In another embodiment, subsetting optimizer 230 determines whether a font file (e.g., 216, 240, and 242) should be subsetted. Subsetting a font file includes, when generating a fixed-layout document, including only those elements (e.g., glyphs, characters, symbols, etc.) of a font that are included in the document. Moreover, subsetting optimizer 230 determines how a font file should be subsetted. Subsetting optimizer 230 includes a page-number evaluator 248, which determines whether a number of pages (e.g., 220, 244, and 246) included in a document satisfies a subsetting-optimization threshold (described in more detail hereinafter). For example, when a number of pages in a document satisfies a subsetting-optimization threshold, a font file is subsetted. Subsetting optimizer 230 also includes a font-size evaluator 252, which determines whether a font size exceeds a font-size threshold. For example, when a size of a font exceeds a font-size threshold, the font file is subsetted based on use throughout the entire document—as opposed to subsetting the font file as the font is used in pages sets.

Figure 3:
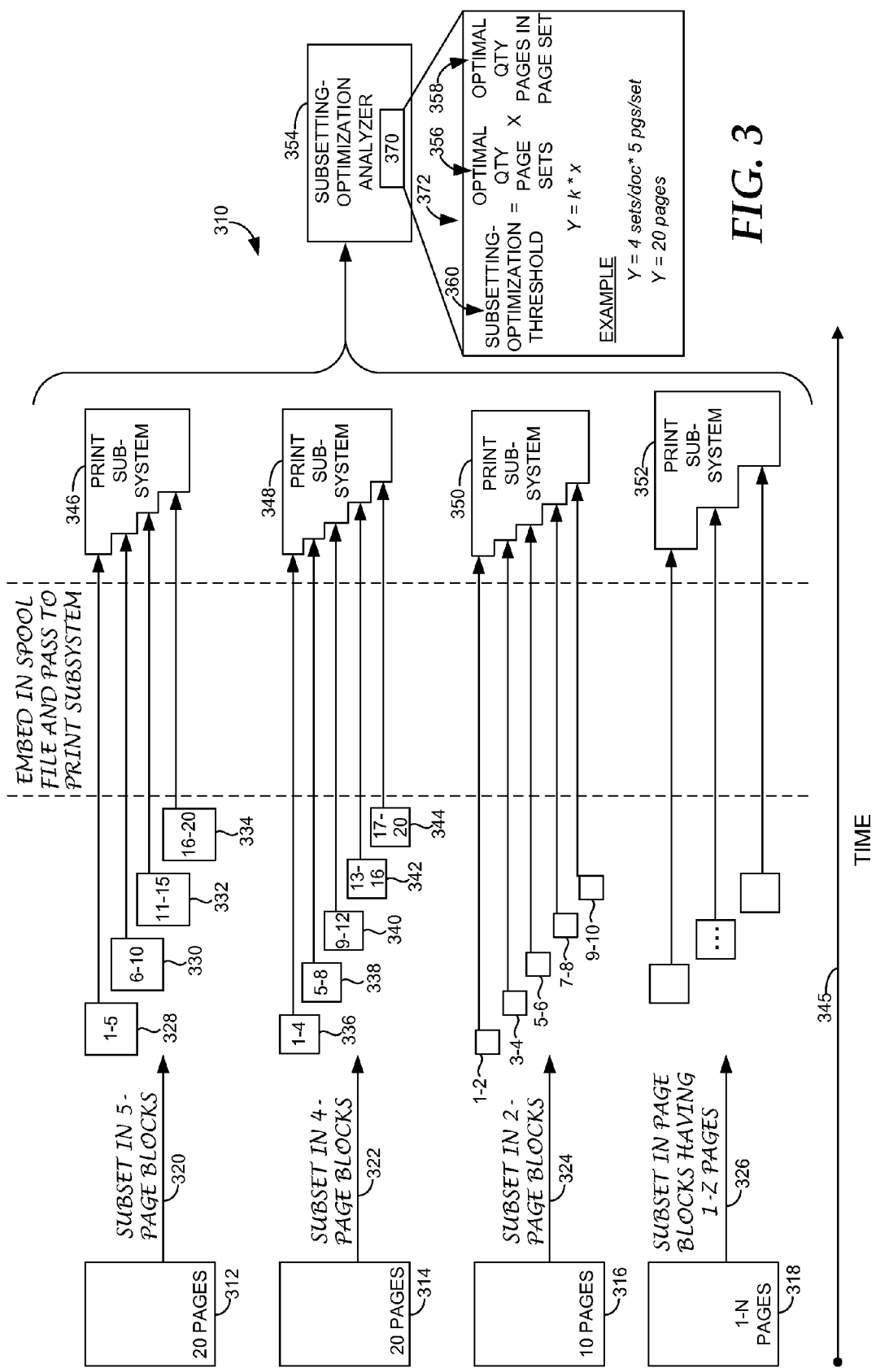
FIG. 3 is a block diagram of an exemplary operating environment in accordance with an embodiment of the present invention.

Reference is made to FIG. 3 to further describe a subsetting-optimization threshold. FIG. 3 depicts various test-group documents 312, 314, 316, and 318. As depicted by arrows 320, 322, 324, and 326, each test-group document is subsetted, such that a plurality of subsetted font files are generated for each test-group document. Then, each subsetted font file is provided to a respective print subsystem 346, 348, 350, and 352. For example, when test-group document 312 is subset, four subsetted font files 328, 330, 332, and 334 are generated. That is, test-group document 312 includes 20 pages and is subset in 5-page blocks, thereby generating four subsetted font files 328, 330, 332, and 334. The four subsetted font files 328, 330, 332, and 334 each apply to a respective range of pages within the 20 pages of document 312. That is, subsetted font file 328 includes elements of a font type that are included within pages 1-5 of document 314 and omits elements that are not included within pages 1-5.

Test-group document 314 is subsetted in page blocks that are different than the 5-page blocks applied to document 314. As depicted by arrow 322, document 314 is subsetted in 4-page blocks, thereby generating five subsetted font files 336, 338, 340, 342, and 344. The five subsetted font files 336, 338, 340, 342, and 344 each apply to a respective range of pages within the 20 pages of document 314. For example, subsetted file 336 includes elements of a font type that are included within pages 1-4 of document 314 and omits elements that are not included within pages 1-4. Test-group document 316 is subsetted in page blocks that are different than both document 312 and document 314. Document 318 and arrow 326 illustrate that a test-group document could include any number of pages (i.e., 1-N) and could be subsetted in page blocks having any number of pages (i.e., 1-Z).

Subsetting test-group documents 312, 314, 316, and 318, which have different page numbers, has varying effects on overall print performance, when considering various print-performance metrics, such as efficiency, time required to print a document, and time prior to initiation of printing. For example, subsetting in 4-page blocks versus 5-page blocks might allow subsetted font file 336 of document 314 to be submitted to a print subsystem faster (e.g., time is depicted by arrow 345) than a subsetted font file 328, since subsetting five pages takes longer than subsetting four pages. Also important is the fact that the font batch cannot be sent to the printer until all drawing of a set of pages have been completed. So, a delay might include, not only the time it takes to prepare the subsetted font, but to prepare all of the next page. However, subsetting in 4-page blocks might generate a higher (i.e., undesirable) amount of subsetted-font-element overlap between each of subsetted files 336, 338, 340, 342, and 344. For example, if document 314 is a word processing document, pages 1-4 of document 314 and pages 5-8 of document 314 might include a lot of the same elements (e.g., letters) of a font, such that when subsetting in 4-page blocks the same elements are being repeatedly subset. Repeatedly subsetting a same element can result in undesired inefficiency.

An embodiment of the present invention is directed to balancing print-performance metrics, such as printing start time and efficiency. For example, print-performance metrics are balanced by controlling a size (e.g., page numbers) of document that is allowed to be subsetted. In addition, metrics are balanced by controlling a quantity of subsetted files that are generated for a font, as well as a size (i.e., page-number size) of page sets that are subsetted, i.e., by controlling how many pages are subset prior to batching. Moreover, metrics are balanced by controlling a size of font files that are subsetted. That is, data generated by subsetting and printing documents 312, 314, 316, and 318 is submitted to subsetting-optimization analyzer 354. Exemplary data that is collected by subsetting-optimization analyzer 354 includes an amount of time that is taken to generate a spool file, an amount of time that it takes to start a print request, an amount of time that it takes to finish a print request, a size of a spool file, and an amount of subsetted-font-element overlap.

In an embodiment, subsetting-optimization analyzer 354 processes collected data to heuristically determine optimal subsetting parameters. Subsetting-optimization analyzer 354 includes information 370, which is depicted in an exploded view 372 for illustrative purposes. Exploded view 372 depicts that optimal subsetting parameters include an optimal quantity of page sets per document 356 and an optimal number of pages in a page set 358. For example, optimal quantity of page sets per document 356 might provide a quantity of page sets per document that typically yield an amount of subsetted-font-element overlap that satisfies an element-overlap threshold. Moreover, optimal number of pages in a page set 358 might typically be subsetted in a duration of time satisfies a time-duration threshold, which sets a maximum time desired to generate a spool file. A product of optimal quantity of page sets per document 356 and optimal number of pages in a page set 358 yields a subsetting-optimization threshold 360, which can be used to manage subsetting related to other documents. Exploded view 372 depicts an exemplary embodiment in which an optimal quantity of pages sets (k) is equal to 4 sets per document, and an optimal quantity of pages in a set (x) is equal to 5 pages per set, such that a subsetting-optimization threshold (Y) is equal to 20 pages.

In addition to analyzing quantity of page sets and quantity of pages per page set, subsetting-optimization analyzer 354 might consider other factors that impact print-performance metrics. For example, subsetting-optimization analyzer 354 might analyze how font size should be taken into consideration when determining how to subset. That is, sometimes a font includes a large font size and a large superset of elements that are actually used in a document. In such a scenario, it might be determined that print-performance metrics are optimized by converting the document in its entirety, as opposed to in page blocks. As such, subsetting-optimization analyzer 354 might determine a font-size threshold, and when a font size of a font type exceeds the font-size threshold, the document is subsetted in its entirety. While printing initiation might be delayed when subsetting the document in its entirety, advantages in font-processing time and spool size are realized when the font includes a large font size and a large superset of elements that are actually used in a document.

Returning to FIG. 2, page-number evaluator 248 includes information 250. In an embodiment, information 250 includes a subsetting-optimization threshold, such as subsetting-optimization threshold 360 described in FIG. 3. As such, when processing a print request, page-number evaluator 248 can reference a subsetting-optimization threshold to determine whether a number of pages to be printed is either above or below the subsetting-optimization threshold.

Subsetting optimizer 230 also includes a font-size evaluator 252, which is usable to determine whether a font size of a font type (e.g., font type A) exceeds a font-size threshold. In an embodiment of the present invention, when a font size of a font type exceeds a font-size threshold, the font type is subsetted throughout the entire document, such that one subsetted font file is generated, as opposed to subsetting the font type in page sets. In an alternative embodiment, font-size evaluator 252 might include a list of font types that are known to have a font size that exceeds a font-size threshold. As such, when font-size evaluator 252 receives a font file, font-size evaluator 252 might reference the list to determine whether the font file has already been deemed to include a font size that prompts subsetting of the font in its entirety.

A further embodiment includes font subsetter 232, which subsets font files consistent with directions from subsetting optimizer 230. For example, generating a subsetted font file might include generating a plurality of subsetted font files, each of which applies to a respective page set of a document. In such a scenario, font subsetter 232 might provide a first subsetted font file to be used to print a document prior to generation of a second subsetted font file. In this respect, printing can be initiated before spooling is completed. For example, printing of a first page can be initiated without waiting for a first batch of pages to be spooled, i.e., printing can be initiated while a font of the batch of pages is being subset. The respective page set of the document might be determined based on an optimal quantity of pages in a page set (e.g., 358 of FIG. 3). In a further embodiment, once a subsetted file has been provided to the print subsystem, font subsetter 232 communicates a subset-discard instruction, which notifies the print subsystem to discard the subsetted font file. By providing a subset-discard instruction, the print subsystem can manage its memory resources more efficiently because it knows this particular font file will not be referenced again during this print job.

In another embodiment, the font subsetter 232 subsets a font throughout all of a document, as opposed to subsetting in page blocks. For example, when a font size of the font type exceeds a font-size threshold, font subsetter 232 subsets the font type throughout the entire document, such that one subsetted font file is generated.

Figure 4:
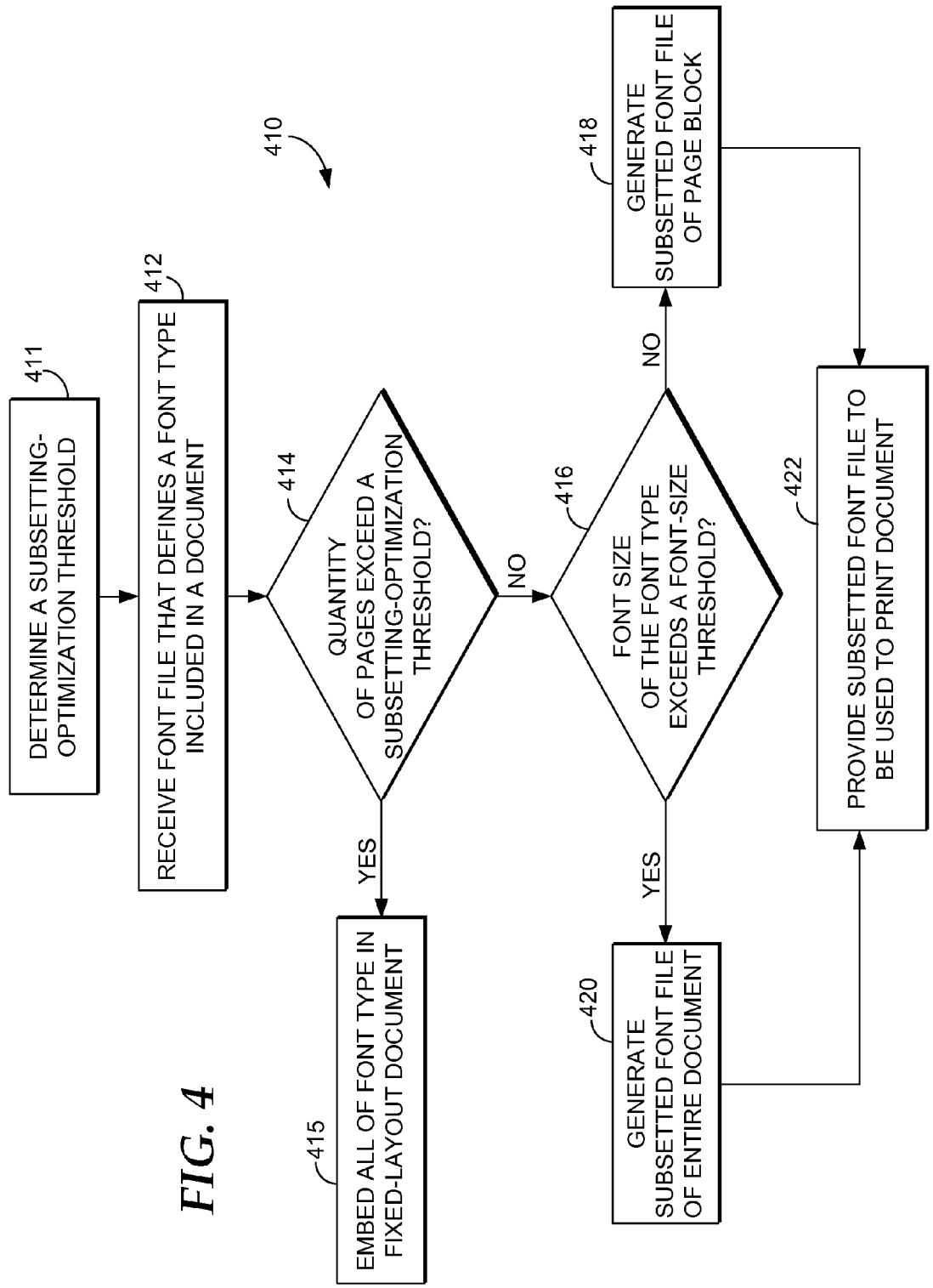
FIG. 4 is an exemplary flow diagram in accordance with an embodiment of the present invention.

Referring to FIG. 4, a flow diagram is depicted that outlines a set of operations performed in an embodiment of the present invention. The set of operations is generally depicted by reference numeral 410 and, when describing FIG. 4, reference might also be made to FIGS. 2 and 3. Operations 410 are directed to providing font-rendering information that is usable to print a document. Operation 411 includes determining a subsetting-optimization threshold. For example, a subsetting-optimization threshold might be determined according to the description of FIG. 3. Likewise, a subsetting-optimization threshold might be determined by referencing a stored value, such as when subsetting optimizer 230 references information 250.

In a further embodiment, operation 412 includes receiving a font file that defines a font type included in the document, which, when printed, generates a quantity of pages. For example, any of font files 216, 240, and 242 might be received by subsetting optimizer 230. That is, lines 215, 227, and 229 each depict a respective font file being communicated to subsetting optimizer 230. Font file 216 defines font type 218 in document 214, which, when printed, generates 17 pages. Font file 240 defines font type 236 in document 226, which, when printed, generates 22 pages. As depicted font files 216 and 240 both define a same font type, which includes "font type A." Font file 242 defines font type 238 in document 228, which, when printed, generates 14 pages. Font file 242 defines "font type ZX," which is different than a font type defined by font files 216 and 240. As previously indicated, although each document 214, 226, and 228 is depicted with one font type, a document often includes multiple different font types on each page and throughout the document.

Operation 414 includes determining whether the quantity of pages satisfies a subsetting-optimization threshold, such as a subsetting-optimization threshold described with respect to FIG. 3. For example, if a subsetting-optimization threshold is defined to be 20 pages, subsetting optimizer 230 might determine that quantity of pages 220 (which depicts "17" pages) does not exceed the subsetting-optimization threshold. Likewise, if a subsetting-optimization threshold is defined to be 20 pages, subsetting optimizer 230 might determine that quantity of pages 246 (which depicts "14" pages) does not exceed the subsetting-optimization threshold. On the other hand, if a subsetting-optimization threshold is defined to be 20 pages, subsetting optimizer 230 might determine that quantity of pages 244 (which depicts "22" pages) exceeds a subsetting-optimization threshold. In scenarios in which a quantity of pages exceeds a subsetting-optimization threshold, all of a font type is embedded in the fixed-layout document, such as depicted in operation 415.

Operation 416 includes determining whether a font size of the font type exceeds a font-size threshold. For example, font-size evaluator 252 might determine whether a font size of font type 218, 236, or 238 exceed a font-size threshold. That is, if a font-size threshold included 10 MB, and font type 218 was 5 MB, font-size evaluator 252 might determine that the font size of font type 218 does not exceed a font-size threshold. In another example, font type 238 might be 15 MB, such that font-size evaluator 252 would determine the size of font type 238 exceeds a 10 MB threshold. In a further embodiment, a font-size threshold is dynamic, such as by applying a threshold percentage. For example, a font-size threshold might be 60%, such that if a font file is 10 MB and a font type contains 5 MB, the font file is subset. However, in this example, if the font type contains 7 MB, the font is sent in its entirety. In another embodiment, font-size evaluator 252 might reference a list of known font types, which include a font size higher than a font-size threshold, to determine if font type 218, 236, or 238 is listed.

Operations 410 also include either generating a subsetted font file of a page block 418 or generating a subsetted font file of an entire document 420. For example, information 254, information 256, and information 258 are being communicated from subsetting optimizer. Information 254 is identified as "Doc. 1" and corresponds to document 214. Information 256 is identified as "Doc. 3" and corresponds to document 228. Information 258 is identified as "Doc. 2" and corresponds to document 226. Font subsetter 232 subsets "Doc. 1" consistent with directions provided by subsetting optimizer. For example, when quantity of pages 220 of document 214 does not exceed a subsetting-optimization threshold, and when a font size of font type 218 does not exceed a font-size threshold, font type 218 is subsetted in page blocks (i.e., operation 418), thereby generating a plurality of subsetted font files 222, 260, 262, and 264. Each of the plurality of subsetted font files applies to a respective range of pages of document 214. For example, subsetted font file 222 includes only elements (e.g., glyphs) of font type 218 that are included in pages 1-5 of document 214 and excludes elements that are not included in pages 1-5.

In a further embodiment, when a first subsetted font file (e.g., 222) is generated, the first subsetted font file is forwarded to a print subsystem prior to generation of a second subsetted font file (e.g., 260), thereby initiating printing earlier than if the entire document was subsetted. As previously described, a number of pages in a page block might be based on an optimal quantity of pages in a page set as determined by subsetting-optimization analyzer 354. In a further embodiment, after subsetted font file 222, 260, 262, and 264 is passed to print subsystem 234, a discard control instruction 266, 268, 270, and 272 is also communicated. That is, after subsetted font file 222 is passed, discard control instruction 266 is sent, thereby instructing print subsystem 234 to discard font resources that have been provided up to that point in time.

As another example, when quantity of pages 246 of document 228 does not exceed a subsetting-optimization threshold, and when a font size of font type 238 does exceed a font-size threshold, font type 238 is subset based on its use throughout Doc. 3, thereby generating a single subsetted font file 274 (i.e., operation 420). In a further example yet, when quantity of pages 244 (i.e., "22" pages) of document 226 exceeds a subsetting-optimization threshold (e.g., 20 pages), Doc. 2 is not subsetted. Instead, all of font type 236 is embedded in a fixed-layout document to be printed (i.e., operation 415).

Operation 422 includes providing the subsetted font file to be used to print the document. For example, subsetted font files 222, 260, 262, 264, and 274 are provided to print subsystem 234. As previously indicated, after subsetted font file 222, 260, 262, and 264 is passed to print subsystem 234, a discard control instruction 266, 268, 270, and 272 is also communicated.

One embodiment of the present invention is directed to a method of providing font-rendering information that is usable to print a document. The method includes receiving a font file that defines a font type included in the document, which, when printed, generates a quantity of pages. Further, a determination is made that the quantity of pages does not exceed a subsetting-optimization threshold. The method also includes generating a subsetted font file of the font type that does not include elements of the font type that are not in at least a portion of the document. The subsetted font file is provided to be used to print the document.

Another embodiment of the present invention is directed to one or more computer-readable media having computer executable instructions stored thereon that, when executed, facilitate a method of providing font-rendering information that is usable to print a document. The method includes determining a subsetting-optimization threshold based on one or more test-group documents, wherein a test-group document is divisible into a quantity of page sets and a page set includes a respective set of pages to be printed. The subsetting-optimization threshold is equal to a product of an optimal quantity of page sets and an optimal quantity of pages in a set of pages. A font file is received that defines a font type included in the document to be printed, which includes a quantity of pages. A determination is made that the quantity of pages does not exceed the subsetting-optimization threshold. The method also includes generating a subsetted font file of a page set of the document, wherein a page-number size of the page set is based on the optimal quantity of pages. The subsetted font file is provided to a print subsystem.

A further embodiment is directed to a system that is implemented using a computing device and that facilitates providing font-rendering information that is usable to print a document. The system includes a subsetting optimizer that receives a font file defining a font type included in the document to be printed, which includes a quantity of pages. The system also includes a page-number evaluator that determines whether the quantity of pages exceeds a subsetting-optimization threshold. The system further includes a font subsetter that generates a subsetted font file of the font type that does not include elements of the font type that are not in at least a portion of the document, wherein the subsetted font file is provided to a print subsystem.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of providing font-rendering information that is usable to print a document, the method comprising:
   receiving by a computing device a font file that defines a font type included in the document, which, when printed, generates a quantity of pages;
   determining by a processor of the computing device whether a subsetting-optimization threshold is satisfied;
   if the subsetting-optimization threshold is not satisfied, providing the font file to be used to print the document; and
   if the subsetting-optimization threshold is satisfied, generating a subsetted font file of the font type that does not include elements of the font type that are not in at least a portion of the document and providing the subsetted font file to be used to print the document.

2. The method of claim 1, wherein providing the subsetted font file includes embedding the subsetted font file in a fixed-layout document.

3. The method of claim 2, wherein the fixed-layout document is an XPS document.

4. The method of claim 1,
   wherein the subsetting-optimization threshold is determined using one or more test-group documents,
   wherein a test-group document is divisible into a quantity of page sets and a page set includes a respective set of pages to be printed, and
   wherein the subsetting-optimization threshold is equal to a product of an optimal quantity of page sets and an optimal quantity of pages in a set of pages.

5. The method of claim 4, wherein the optimal quantity of page sets is heuristically determined, such that a plurality of subsetted font files, which apply to the optimal quantity of page sets, include an amount of subsetted-font-element overlap that satisfies an element-overlap threshold.

6. The method of claim 4, wherein the optimal quantity of pages is heuristically determined, such that a duration of time required to generate a subsetted font of the optimal quantity of pages satisfies a time-duration threshold.

7. The method of claim 1,
   wherein the document is divisible into page sets; and
   wherein generating the subsetted font file includes generating a plurality of subsetted font files, each of which applies to a respective page set.

8. The method of claim 7, wherein, when a first subsetted font file is generated, the first subsetted font file is forwarded to a print subsystem prior to generation of a second subsetted font file.

9. The method of claim 8 further comprising, sending a subset-discard instruction that notifies the print subsystem to discard the first subsetted font file.

10. The method of claim 1, wherein, when a font size of the font type exceeds a font-size threshold, the document is subsetted in its entirety, such that one subsetted font file is generated.

11. The method of claim 1,
   wherein the document is divisible into page sets; and
   wherein, when a font size of the font type does not exceed a font-size threshold, generating the subsetted font file includes generating a plurality of subsetted font files, each of which applies to a respective page set.

12. One or more computer memory devices having computer executable instructions stored thereon that, when executed, facilitate a method of providing font-rendering information comprising:
   receiving a font file that defines a font type included in the document, the font type including a font size;
   determining by a processor of the computing device that the font size exceeds a font-size threshold;
   generating a subsetted font file of the font type that does not include elements of the font type that are not in at least a portion of the document; and
   providing the subsetted font file to be used to print the document.

13. The one or more computer memory devices of claim 12 further comprising, subsetting the document in its entirety when it is determined that the font size exceeds the font-size threshold, such that one subsetted font file is generated when the font size exceeds the font-size threshold.

14. The one or more computer memory devices of claim 12, wherein providing the subsetted font file includes embedding the subsetted font file in a fixed-layout document.

15. The one or more computer memory devices of claim 14, wherein the fixed-layout document is an XPS document.

16. A system including a processor coupled to a computer memory device, which stores computer-executable instructions that, when executed using the processor, perform operations that provide font-rendering information, which is usable to print a document, the system comprising:
- a subsetting optimizer running on the processor that receives a font file defining a font type included in the document to be printed, the font type including a font size;
- a font-size evaluator running on the processor that determines whether the font size exceeds a subsetting-optimization threshold; and
- a font subsetter running on the processor that generates a subsetted font file of the font type that does not include elements of the font type that are not in at least a portion of the document, wherein the subsetted font file is provided to a print subsystem.

17. The system of claim 16, wherein the font subsetter subsets the document in its entirety when it is determined that the font size exceeds the font-size threshold, such that one subsetted font file is generated when the font size exceeds the font-size threshold.

18. The system of claim 16, wherein the system is configured to embed the subsetted font file in a fixed-layout document.

19. The system of claim 18, wherein the fixed-layout document is an XPS document.

20. The system of claim 16, wherein the font-size threshold includes a threshold number of bytes.

* * * * *